United States Patent [19]
Drelich et al.

[11] 4,144,209

[45] Mar. 13, 1979

[54] RESIN LATEX COMPOSITIONS

[75] Inventors: Arthur H. Drelich, Plainfield; George J. Lukacs, Perth Amboy, both of N.J.

[73] Assignee: Johnson & Johnson, New Brunswick, N.J.

[21] Appl. No.: 631,012

[22] Filed: Nov. 12, 1975

Related U.S. Application Data

[60] Continuation of Ser. No. 566,462, Apr. 9, 1975, abandoned, which is a continuation of Ser. No. 462,290, Apr. 19, 1974, abandoned, which is a division of Ser. No. 328,555, Feb. 1, 1973, Pat. No. 3,889,024.

[51] Int. Cl.$^2$ ............... C08L 31/04; C08L 101/04; C08L 101/08
[52] U.S. Cl. ............... 260/29.2 M; 260/29.2 E; 260/29.2 N; 260/29.6 H; 260/29.6 BM; 260/29.6 M; 260/29.6 MM; 260/29.6 MN; 260/29.6 RB; 260/29.6 RW; 260/29.6 T; 260/29.6 WA; 260/29.6 WB; 260/29.6 XA; 260/876 B; 427/243
[58] Field of Search ............... 427/243; 260/29.2 N, 260/29.2 E, 29.7 M, 29.7 N, 29.7 P, 29.6 MN, 29.6 M, 29.6 MP, 29.6 MM, 29.6 WA, 29.6 XA, 29.6 H, 29.6 RW, 29.2 M, 29.6 BM, 29.6 RB

[56] References Cited

U.S. PATENT DOCUMENTS

| | | | |
|---|---|---|---|
| 3,536,518 | 10/1970 | Drelich et al. | 427/288 |
| 3,649,330 | 3/1972 | Drelich | 427/288 |

FOREIGN PATENT DOCUMENTS 1107717  3/1968  United Kingdom.

*Primary Examiner*—Thomas De Benedictis, Sr.
*Attorney, Agent, or Firm*—Charles J. Metz

[57] ABSTRACT

Improved stable, aqueous resin compositions comprising from about 0.1% to about 60% by weight on a solids basis of a synthetic resin and from about 0.01% by weight to about 6% by weight, based on the weight of the synthetic resin, of an aluminum chlorhydroxide complex from the group consisting of: (a) aluminum chlorhydroxides; (b) reaction products of aluminum chlorhydroxides and polyhydroxy compounds; (c) reaction products of aluminum chlorhydroxides and monocarboxylic acids; (d) and mixtures thereof; and methods of utilizing the same.

9 Claims, No Drawings

RESIN LATEX COMPOSITIONS

This is a continuation of application Ser. No. 566,462, filed Apr. 9, 1975; which is a continuation of application Ser. No. 462,290, filed Apr. 19, 1974, both now abandoned, which is a division of application Ser. No. 328,555, filed Feb. 1, 1973, now U.S. Pat. No. 3,889,024.

The present invention relates to improved stable, aqueous resin compositions and to methods of utilizing the same. More specifically, the present invention relates to stable, aqueous resin compositions which are intended to be applied to porous or absorbent materials such as textile materials, paper, paper products, wood, leather, polyurethane and other foams, wall board, concrete, cinder block, etc. and to methods of applying such resin compositions to such porous or absorbent materials so as to control the extent of the migration, diffusion, penetration, or spreading of such resin compositions on or into the porous or absorbent materials.

GENERAL BACKGROUND

In many industries such as the textile, paper, paper products, wood, leather, polyurethane foam, printing arts, decorative arts, building materials and like industries, there is often a need to apply a stable, aqueous resin composition to porous or absorbent materials and to maintain such resin composition in the same shape, size and configuration, as well as in the same location, on the porous or absorbent materials where it was originally applied without undesirably migrating, penetrating, or spreading materially therefrom in any direction to any substantial extent on or into the porous or absorbent materials.

PURPOSES AND OBJECTS

It is therefore a principal purpose and object of the present invention to provide improved, stable aqueous resin compositions which can be applied to porous or absorbent materials in such fashion as to control the extent of the migration, diffusion, penetration or spreading of the resin composition or into the porous or absorbent materials.

STATEMENT OF THE INVENTION

It has been found that such purpose and object, as well as other purposes and other objects, which will become clear from a further reading hereof, may be achieved by applying to the porous or absorbent materials a stable aqueous resin composition comprising from about 0.1% to about 60% by weight on a solids basis of a synthetic resin and from about 0.01% by weight to about 6% by weight, based on the weight of the synthetic resin, of an aluminum chlorhydroxide complex from the group consisting of: (a) aluminum chlorhydroxides; (b) reaction products of aluminum chlorhydroxides and polyhydroxy compounds; (c) reaction products of aluminum chlorhydroxides and monocarboxylic acids; (d) and mixture thereof.

The present invention will be described in greater particularity herein purely for illustrative but not limitative purposes insofar as it realates to porous, absorbent fibrous sheet materials and to their methods of manufacture. More particularly, the present invention is concerned with the so-called bonded, "nonwoven" textile fabrics, i.e., fabrics produced from textile fibers without the use of conventional spinning, weaving, knitting or felting operations. Although not limited thereto, the invention is of primary importance in connection with nonwoven fabrics derived from "oriented" or carded fibrous webs composed of textile-length fibers, the major proportion of which are oriented predominantly in one direction.

Typical of such fabrics are the so-called "MASSLINN" nonwoven fabrics, some of which are described in greater particularity in U.S. Pat. Nos. 2,705,687 and 2,705,688, issued Apr. 5, 1955, to D. R. Petterson et al. and I. S. Ness et al., respectively.

Another aspect of the present invention is its application to nonwoven fabrics wherein the textile-length fibers were originally predominantly oriented in one direction but have been reorganized and rearranged in predetermined designs and patterns of fabric openings and fiber bundles. Typical of such latter fabrics are the so-called "KEYBAK" bundled nonwoven fabrics, some of which are described in particularity in U.S. Pat. Nos. 2,862,251 and 3,033,721, issued Dec. 2, 1958 and May 8, 1962, respectively, to F. Kalwaites.

Still another aspect of the present invention is its application to nonwoven fabrics wherein the textile-length fibers are disposed at random by air-laying techniques and are not predominantly oriented in any one direction. Typical nonwoven fabrics made by such procedures are termed "isotropic" nonwoven fabrics and are described, for example, in U.S. Pat. Nos. 2,676,363 and 2,676,364, issued Apr. 27, 1954, to C. H. Plummer et al.

And, still another aspect of the present invention is its application to nonwoven fabrics which comprise textile-length fibers and which are made basically by conventional or modified aqueous paper making techniques such as are described in greater particularity in pending patent application Ser. No. 4,405, filed Jan. 20, 1970 by P. R. Glor and A. H. Drelich. Such fabrics are also basically "isotropic" and generally have like properties in all directions.

the conventional base starting material for the majority of these nonwoven fabrics is usually a fibrous web comprising any of the common textile-length fibers, or mixtures thereof, the fibers varying in average length from approximately one-half inch to about two and one-half inches. Exemplary of such fibers are the natural fibers such as cotton and wool and the synthetic or man-made cellulosic fibers, notably rayon or regenerated cellulose.

Other textile length fibers of a synthetic or man-made origin may be used in various proportions to replace either partially or perhaps even entirely the previously-named fibers. Such other fibers include: polyamide fibers such as nylon 6, nylon 66, nylon 610, etc.; polyester fibers such as "Dacron", "Fortrel" and "Kodel"; acrylic fibers such as "Acrilan", "Orlon" and "Creslan"; modacrylic fibers such as "Verel" and "Dynel"; polyolefinic fibers derived from polyethylene and polypropylene; cellulose ester fibers such as "Arnel" and "Acele"; polyvinyl alcohol fibers; etc.

These textile length fibers may be replaced either partially or entirely by fibers having an average length of less than about one-half inch and down to about one-quarter inch. These fibers, or mixtures thereof, are customarily processed through any suitable textile machinery (e.g., a conventional cotton card, a "RandoWebber", a paper making machine, or other fibrous web producing apparatus) to form a web or sheet of loosely associated fibers, weighing from about 100 grains to about 2000 grains per square yard or even higher.

If desired, even shorter fibers, such as wood pulp fibers or cotton linters, may be used in varying proportions, even up to 100%, where such shorter length fibers can be handled and processed by available apparatus. Such shorter fibers have lengths less than ¼ inch.

The resulting fibrous web or sheet, regardless of its method of production, is then subjected to at least one of several types of bonding operations to anchor the individual fibers together to form a self-sustaining web. One method is to impregnate the fibrous web over its entire surface area with various well-known bonding agents, such as natural or synthetic resins. Such over-all impregnation produces a nonwoven fabric of good longitudinal and cross strength, acceptable durability and washability, and satisfactory abrasion resistance. However, the nonwoven fabric tends to be somewhat stiff and boardlike, possessing more of the properties and characteristics of paper or board than those of woven or knitted textile fabric. Consequently, although such over-all impregnated nonwoven fabrics are satisfactory for many uses, they are still basically unsatisfactory as general purpose textile fabrics.

Another well-known bonding method is to print the fibrous webs with intermittent or continuous straight or wavy lines, or areas of binder extending generally transversely or diagonally across the web and additionally, if desired, along the fibrous web. The resulting nonwoven fabric, as exemplified by a product disclosed in the Goldman U.S. Pat. No. 2,039,312 and sold under the trademark "MASSLINN", is far more satisfactory as a textile fabric than over-all impregnated webs in that the softness, drape and hand of the resulting nonwoven fabric more nearly approach those of a woven or knitted textile fabric.

The printing of the resin binder on these nonwoven webs is usually in the form of relatively narrow lines, or elongated rectangular, triangular or square areas, or annular, circular, or elliptical binder areas which are spaced apart a predetermined distance which, at its maximum, is preferably slightly less than the average fiber length of the fibers constituting the web. This is based on the theory that the individual fibers of the fibrous web should be bound together in as few places as possible.

The nominal surface coverage of such binder lines or areas will vary widely depending upon the precise properties and characteristics of softness, drape, hand and strength which are desired in the final bonded product. In practice, the nominal surface coverage can be designed so that it falls within the range of from about 10% to about 50% of the total surface of the final product. Within the more commercial aspects of the present invention, however, nominal surface coverages of from about 12% to about 40% are preferable.

Such bonding increases the strength of the nonwoven fabric and retains substantially complete freedom of movement for the individual fibers whereby the desirable softness, drape and hand are obtained. This spacing of the binder lines and areas has been accepted by the industry and it has been deemed necessarily so, if the stiff and board-like appearance, drape and hand of the over-all impregnated nonwoven fabrics are to be avoided.

The nonwoven fabrics bonded with such line and area binder patterns have had the desired softness, drape and hand and have not been undesirably stiff or board-like. However, such nonwoven fabrics have also possessed some disadvantages.

For example, the relatively narrow binder lines and relatively small binder areas of the applicator (usually an engraved print roll) which are laid down on the fibrous web possess specified physical dimensions and inter-spatial relationships as they are initially laid down. Unfortunately, after the binder is laid down on the wet fibrous web and before it hardens or becomes fixed in position, it tends to spread, diffuse or migrate whereby its physical dimensions are increased and its inter-spatial relationships decreased. And, at the same time, the binder concentration in the binder area is lowered and rendered less uniform by the migration of the binder into adjacent fibrous areas. One of the results of such migration is to make the surface coverage of the binder areas increase whereby the effect of the intermittent bonding approaches the effect of the over-all bonding. As a result, some of the desired softness, drape and hand are lost and some of the undesired properties of harshness, stiffness and boardiness are increased.

Various methods have been proposed to prevent or to at least limit such spreading, diffusing or migration tendencies of such intermittent binder techniques.

For example, U.S. Pat. No. 3,009,822, issued Nov. 21, 1961 to A. H. Drelich et al., discloses the use of a non-migratory regenerated cellulose viscose binder which is applied in intermittent fashion to fibrous webs under conditions wherein migration is low and the concentration of the binder in the binder area is as high as 35% by weight, based on the weight, of the fibers in these binder areas. Such viscose binder possesses inherently reduced spreading, diffusing and migrating tendencies, thereby increasing the desired softness, drape and hand of the resulting nonwoven fabric. This viscose binder has found acceptance in the industry but the use of other more versatile binders has always been sought.

Resins, or polymers as they are often referred to herein as interchangeable terms, are high molecular weight organic compounds and, as used herein, are of a synthetic or man-made origin. These synthetic or man-made polymers have a chemical structure which usually can be represented by a regularly repeating small unit, referred to as a "mer", and are formed usually either by an addition or a condensation polymerization of one or more monomers. Examples of addition polymers are the polyvinyl chlorides, the polyvinyl acetates, the polyacrylic resins, the polyolefins, the synthetic rubbers, etc. Examples of condensation polymers are the polyurethanes, the polyamides, the polyesters, etc.

Of all the various techniques employed in carrying out polymerization reactions, emulsion polymerization is one of the most commonly used. Emulsion polymerized resins, notably polyvinyl chlorides, polyvinyl acetates, and polyacrylic resins, are widely used throughout many industries. Such resins are generally produced by emulsifying the monomers, stabilizing the monomer emulsion by the use of various surfactant systems, and then polymerizing the monomers in the emulsified state to form a stabilized resin polymer. The resin polymer is usually dispersed in an aqueous medium as discrete particles of colloidal dimensions (1 to 2 microns diameter or smaller) and is generally termed throughout the industry as a "resin dispersion", or a "resin emulsion" or "latex".

Generally, however, the average particle size in the resin dispersion is in the range of about 0.1 micron (or micrometer) diameter, with individual particles ranging up to 1 or 2 microns in diameter and occasionally up to as high as about 3 or 5 microns in size. The particle sizes of such colloidal resin dispersions vary a great deal, not only from one resin dispersion to another but even within one resin dispersion itself.

The amount of resin binder solids in the resin colloidal aqueous dispersion varies from about 1/10% solids by weight up to about 60% by weight or even higher solids, generally dependent upon the nature of the monomers used, the nature of the resulting polymer resin, the surfactant system employed, and the conditions under which the polymerization was carried out.

These resin colloidal dispersions, or resin emulsions, or latexes, may be anionic, non-ionic, or even polyionic, and stable dispersions are available commercially at pH's of from about 3½ to about 10 and these are the pH ranges of the application of the present inventive concept.

The amount of resin which is applied to the porous or absorbent material varies within relatively wide limits, depending upon the resin itself, the nature and character of the porous or absorbent materials to which the resins are being applied, its intended use, etc. A general range of from about 4% by weight up to about 50% by weight, based on the weight of the porous or absorbent material, is satisfactory under substantially all uses. Within the more commercial limits, however, a range of from about 10% to about 30% by weight, based on the weight of the porous or absorbent material, is preferred.

Such resins have found use in the coating industries for the coating of woven fabrics, paper and other materials. The resins are also used as adhesives for laminating materials or for bonding fibrous webs. These resins have also found wide use as additives in the manufacture of paper, the printing industry, the decorative printing of textiles, and in other industries.

In most instances, the resin is colloidally dispersed in water and, when applied from the aqueous medium to a porous or absorbent sheet material which contains additional water is carried by the water until the water is evaporated or otherwise driven off. If it is desired to place the resin only on the surface of the wet porous or absorbent sheet material and not to have the resin penetrate into the porous or absorbent sheet material, such is usually not possible inasmuch as diffusion takes place between the aqueous colloidal resin and the water in the porous material. In this way, the colloidal resin tends to spread into and throughout the porous material and does not remain merely on its surface.

Or, if it is desired to deposit the resin in a specific intermittent print pattern, such as is used in bonding nonwoven fabrics, the aqueous colloid tends to diffuse and to wick along the individual fibers and to carry the resin with it beyond the confines of the nominal intermittent print pattern. As a result, although initially placed on the nonwoven fabric in a specific intermittent print pattern, the ultimate pattern goes far beyond that due to the spreading or migration which takes place due to the diffusion of the water and the resin, until the water is evaporated or otherwise driven off.

As pointed out previously, the resin composition which is applied to the porous or absorbent materials comprises: (1) a synthetic resin and (2) a migration control agent.

THE SYNTHETIC RESINS

The synthetic resins may be selected from a relatively large group of synthetic resins well know in industry for bonding, coating, impregnating or related uses, and may be of a self cross-linking type, externally crosslinking type, or not cross-linked. Specific examples of such synthetic resins include: polymers and copolymers of vinyl ethers; vinyl halides such as plasticized and unplasticized polyvinyl chloride, polyvinyl chloride-polyvinyl acetate, ethylene-vinyl chloride, etc.; polymers and copolymers of vinyl esters such as plasticized and unplasticized polyvinyl acetate, ethylene-vinyl acetate, acrylic-vinyl acetate, etc.; polymers and copolymers of the polyacrylic resins such as ethyl acrylate, methyl acrylate, butyl acrylate, ethylbutyl acrylate, ethyl hexyl acrylate, hydroxyethyl acrylate, dimethyl amino ethyl acrylate, etc.; polymers and copolymers of the polymethacrylic resins such as methyl methacrylate, ethyl methacrylate, isopropyl methacrylate, butyl methacrylate, etc.; polymers and copolymers of acrylonitrile, methacrylonitrile, acrylamide, N-isopropyl acrylamide, N-methylol acrylamide, methacrylate, etc.; vinylidene polymers and copolymers, such as polyvinylidene chloride, polyvinylidene chloride-vinyl chloride, polyvinylidene chloride-ethyl acrylate, polyvinylidene chloride-vinyl chloride-acrylonitrile, etc.; polymers and copolymers of polyolefinic resins including polyethylene, polypropylene, ethylene-vinyl chloride and ethylene-vinyl acetate which have been listed previously; the synthetic rubbers such as 1,2-butadiene, 1,3-butadiene, 2-ethyl-1,3-butadiene, high, medium and carboxylated butadiene-acrylonitrile, butadiene-styrene, chlorinated rubber, etc., natural latex; the polyurethanes; the polyamides; the polyesters; the polymers and copolymers of the styrenes including: styrene, 2-methyl styrene, 3-methyl styrene, 4-methyl styrene, 4-ethyl styrene, 4-butyl styrene; natural latex; phenolic emulsions; etc.

These resins may be used either as homopolymers comprising a single repeating monomer unit, or they may be used as copolymers comprising two, three, or more different monomer units which are arranged in random fashion, or in a definite order alternating fashion, within the polymer chain. Also included within the inventive concept are the block polymers comprising relatively long blocks of different monomer units in a polymer chain and graft polymers comprising chains of one monomer attached to the backbone of another polymer chain.

THE MIGRATION CONTROL AGENT

To the aqueous dispersion of synthetic resin solids is added a small amount of from about 0.1% by weight to about 6% by weight of a migration control agent comprising an aluminum chlorhydroxide or a reaction product of an aluminum chlorhydroxide and a polyhydroxy compound or a reaction product of aluminum chlorhydroxide and a monocarboxylic acid, or mixtures thereof.

THE ALUMINUM CHLORHYDROXIDES

Aluminum chlorhydroxides or aluminum basic chlorides are water-soluble, colorless, complexes of the Werner type and have the generic structural formula $Al_2(OH)_xCl_{6-x}$. The generic formula is:

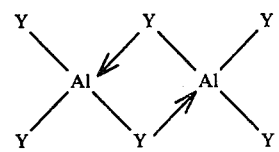

in which Y is hydroxyl or chloride (from 1-5 hydroxyls and from 5-1 chloride radicals). Illustrative examples include:

$Al_2(OH)Cl_5.8H_2O$
$Al_2(OH)_2Cl_4.6H_2O$
$Al_2(OH)_3Cl_3.6H_2O$
$Al_2(OH)_4Cl_2.5H_2O$
$Al_2(OH)_5Cl.2H_2O$

THE REACTION PRODUCTS OF ALUMINUM CHLORHYDROXIDES AND POLYHYDROXY COMPOUNDS

The reaction products of aluminum chlorhydroxides and polyhydroxy compounds are colorless and chemically reactive and are believed to be aluminum inorganic-organic complexes of the Werner types. They are reaction products of an aluminum chlorhydroxide and a polyhydroxy compound such as: ethylene glycol; phenyl ethylene glycol; 1,2-propanediol; 1,2-propanediol-2-methyl; 1,2-propanediol-3-(dimethylamino); 1,3-propanediol; 1,3-propanediol-2,2-dimethyl; 1,3-propanediol-2-amino-2-methyl; 1,3-propanediol-2-amino-2-ethyl; 1,3-propanediol-2,2-diethyl; 1,3-propanediol-2(hydroxymethyl)-2-methyl; 1,3-propanediol-2-methyl-2-propyl; 1,2-butanediol; 1,2-butanediol-3-methyl; 1,3-butanediol; 1,3-butanediol-3-methyl; 1,4-butanediol; 2,3-butanediol; 2,3-butanediol-2,3-dimethyl; 2,3-butanediol-2-methyl; 2,3-butanediol-2,3-diethyl; 1,2-pentanediol; 2,3-pentanediol-2,4,4-trimethyl; 1,3-pentanediol; 1,3-pentanediol-2,2,4-trimethyl; 1,4-pentanediol; 1,4-pentanediol-2,2,4-trimethyl; 1,5-pentanediol; 1,5-pentanediol-2,2-dimethyl; 2,3-pentanediol; 2,3-pentanediol-2,4,4-trimethyl; 2,4-pentanediol; 2,4-pentanediol-2-methyl; 2,4-pentanediol-3-methyl; 1,6-hexanediol; 2,3-hexanediol; 2,5-hexanediol; 2,5-hexanediol-2,5-dimethyl; 1,7-heptanediol; glycerol; glycerol-methyl ether; glycerol-2-methyl ether; glycerol-1-phenyl ether; diglycerol; erythritol; pentaerythritol; 1,2,3-butanetriol; 1,2,4-butanetriol; 1,2,3-pentanetriol; 2-propenediol; 2-butene-1,2-diol; 3-butene-,1,2-diol; ethylene glycol methyl ether; ethylene glycol ethyl ether; diethylene glycol methyl ether; diethylene glycol ethyl ether; etc.

THE REACTION PRODUCTS OF ALUMINUM CHLORHYDROXIDES AND MONOCARBOXYLIC ACIDS

The reaction products of aluminum chlorhydroxides and monocarboxylic acids are colorless, chemically reactive complexes of the Werner type and are believed to have the following generic formula:

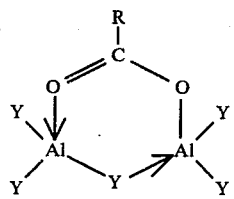

in which Y is hydroxyl or chloride (from 1-4 hydroxyls and from 4-1 chloride radicals) and R is alkyl, alkenyl, alkaryl, aralkyl and aryl.

The monocarboxylic acids which are used to react with the aluminum chlorhydroxide are selected from a group of aliphatic and aromatic acids such as: melissic acid, cerotic acid, lignoceric acid, behenic acid, arachidic acid, nondecylic acid, stearic acid, α-hydroxy stearic acid, margaric acid, palmitic acid, pentadecylic acid, myristic acid, tridecylic acid, lauric acid, undecylic acid, capric acid, nonanoic acid, caprylic acid, heptanoic acid, caproic acid, valeric acid, isobutyric acid, n-butyric acid, propionic acid, acetic acid, glycollic acid, lactic acid, β-hydroxypropionic acid, α-hydroxybutyric acid, β-hydroxybutyric acid, glyceric acid, acrylic acid, α-crotonic acid, isocrotonic acid, 2-methyl-acrylic acid, vinylacetic acid, angelic acid, tiglic acid, itaconic acid, elaidic acid, cinnamic acid, oleic acid, linoleic acid, linolenic acid, propargylic acid, isopropyl benzoic acid, methoxybenzoic acid, benzoic acid, abietic acid, phenylacetic acid, diphenylacetic acid, triphenylacetic acid, phenylpropionic acid, o-toluic acid, m-toluic acid, p-toluic acid, salicylic acid, anisic acid, gallic acid, α-naphthoic acid, β-naphthoic acid, syringic acid, anthranilic acid, etc.

The synthetic resin and the migration control agent exist together as a stable aqueous composition and normally do not agglomerate, coagulate, or precipitate. However, if the aqueous composition is diluted with sufficient additional amounts of water, the resin solids immediately agglomerate, coagulate and precipitate in place with no further spreading, diffusion, penetration, or migration on or into the porous or absorbent materials.

The dilution may be effected in different ways in order to activate the reaction mechanism. For example, the porous or absorbent fibrous material may be pretreated by being pre-wet with a sufficient quantity of an aqueous medium, preferably water, whereby the resin composition immediately becomes sufficiently diluted. Or, if desired, the resin composition may be first printed on the porous or absorbent fibrous material and then substantially immediately treated with the aqueous medium such as water to effect the dilution whereupon the resin particles substantially immediately agglomerate or coagulate in place with no further spreading, diffusion or migration.

The amount of the water applied to the fibrous web varies widely, depending upon many factors, the most important of which is the nature, concentration, properties and characteristics of the synthetic resin, and the migration control agent themselves. Normally, the amount of water applied to the fibrous web is in the range of from about 140% to about 280%, and is preferably from about 160% to about 220%, based on the weight of the fibrous web being treated. Such amounts are controlled by the use of suitable conventional vacuum apparatus, nip-rolls, squeezerolls, etc.

The amount of water which is applied to the fibrous web prior to the printing of the resin binder also affects the degree of control exercised over the coagulation and migration. The greater the amount of water, the greater is the control and the more rapid is the coagulation and the less is the migration. On the other hand, the less the amount of water in the fibrous web, the less is the control exercised, the less rapid is the coagulation and the greater is the migration.

When printed on a pre-wetted fibrous web during the manufacture of nonwoven fabrics, the total migration of the resin binder solids may be reduced to as little as about 50% or less beyond the originally deposited area. In some instances, the migration is relatively negligible.

Normally, however, the increase in area of the resin binder solids, even under the most adverse conditions, does not materially exceed about 200%. Such values are to be compared to increases in binder migration of at least about 300% and up to about 800% when emulsion polymerized resins are applied to fibrous porous absorbent sheet materials, unaided by the principles disclosed herein.

The concentration of the binder resin solids in the binder area is correspondingly increased when utilizing the principles of the present invention and is in the range of from about 50% by weight to about 120% by weight, and more normally from about 60% to about 80% by weight, based on the weight of the fibers in the binder area.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

EXAMPLE I

A fibrous card web weighing about 500 grains per square yard and comprising 100% rayon fibers 1½ denier and 1½ inches in length is intermittently print bonded by the rotogravure process using an engraved roll having 6 horizontal wavy lines per inch. The width of each line as measured on the engraved roll is 0.024 inch.

The composition by weight of the resin binder formulation used for the intermittent print-bonding is:
(1) 5.8 lbs. of a 55% solids latex of Air Reduction Aircoflex 510, a copolymer of ethylene and vinyl acetate stabilized with a nonionic surfactant
(2) 45 ml. of a 50 % aqueous solution of "WICKENOL 303" aluminum chlorhydroxide complex $Al_2(OH)_5Cl.xH_2O$, sp. gr. 1.3
(3) Blue coloring 0.1 lb.
(4) Anti-foam agent 0.05 lb.

The formulation has a pH of 4.6 and a viscosity of 300 (Brookfield, #3 spindle, 30 rpm).

The fibrous card web is pretreated or pre-moistened with a large amount of water to the extent of about 190% moisture based on the weight of the fibers in the web.

The extra dilution with water is sufficient by itself to upset the stability of the resin dispersion when applied to the web and it instantly coagulates and precipitates on the very wet fibrous web. The printed web is then processed, dried and cured.

The width of the binder line in the finished product is about 0.05 inch which represents a controlled total migration of about 108%.

The resulting nonwoven fabric has a finished weight of 650 grains per square yard and has excellent strength, excellent softness, drape and hand, and excellent cross-resilience.

EXAMPLE IA

The procedures of Example I are followed substantially as set forth therein with the exception that 5.2 lbs. of the copolymer are used along with 65 ml. of the aluminum chlorhydroxide complex.

The results are comparable to those obtained in Example I and the product is commercially acceptable.

EXAMPLE II

A fibrous card web weighing about 500 grains per square yard and comprising 100% rayon fibers 1½ denier and 1½ inches in length is intermittently print bonded by the rotogravure process using an engraved roll having 6 horizontal wavy lines per inch. The width of each line as measured on the engraved roll is 0.024 inch.

The composition by weight of the resin binder formulation used for the intermittent print-bonding is:
(1) 6.5 lbs. of a 50% solids latex of National Starch 2892, primarily a polyethyl acrylte polymer
(2) 55 ml. of a 50% aqueous solution of "WICHENOL 303" aluminum chlorhydroxide complex $Al_2(OH)_5Cl.xH_2O$, sp. gr. 1.3
(3) Blue coloring 0.1 lb.
(4) Anti-foam agent 0.05 lb.

The formulation has a pH of 4.7 and a viscosity of 500 (Brookfield, #3 spindle, 30 rpm).

The fibrous card web is pretreated or pre-moistened with a large amount of water to the extent of about 200% moisture based on the weight of the fibers in the web.

The extra dilution with water is sufficient by itself to upset the stability of the resin dispersion when applied to the web and it instantly coagulates and precipitates on the very wet fibrous web. The printed web is then processed, dried and cured.

The width of the binder line in the finished product is about 0.048 inch which represents a controlled total migration of about 100%.

The resulting nonwoven fabric has a finished weight of 650 grains per square yard and has excellent strength, excellent softness, drape and hand, and excellent cross-resilience.

EXAMPLE III

A fibrous card web weighing about 500 grains per square yard and comprising 100% rayon fibers 1½ denier and 1½ inches in length is intermittently print bonded by the rotogravure process using an engraved roll having 6 horizontal wavy lines per inch. The width of each line as measured on the engraved roll is 0.024 inch.

The composition by weight of the resin binder formulation used for the intermittent print-bonding is:
(1) 7.2 lbs. of a 46% solids latex of Rohm & Haas HA-8, a polyethyl acrylate polymer
(2) 45 ml. of a 50% aqueous solution of "WICKENOL 303" aluminum chlorhydroxide complex $Al_2(OH)_5Cl.xH_2O$, sp. gr. = 1.3
(3) Blue coloring 0.1 lb.
(4) Anti-foam agent 0.05 lb.

The formulation has a Ph of 5.7 and a viscosity of 600 (Brookfield, #3 spindle, 30 rpm).

The fibrous card web is pretreated or pre-moistened with a large amount of water to the extent of about 180% moisture based on the weight of the fibers in the web.

The extra dilution with water is sufficient by itself to upset the stability of the resin dispersion when applied to the web and it instantly coagulates and precipitates on the very wet fibrous web. The printed web is then processed, dried and cured.

The width of the binder line in the finished product is about 0.05 inch which represents a controlled total migration of about 108%.

The resulting nonwoven fabric has a finished weight of 650 grains per square yard and has excellent strength, excellent softness, drape and hand, and excellent cross-resilience.

EXAMPLE IV

A fibrous card web weighing about 500 grains per square yard and comprising 100% rayon fibers 1½ denier and 1½ inches in length is intermittently print bonded by the rotogravure process using an engraved roll having 6 horizontal wavy lines per inch. The width of each line as measured on the engraved roll is 0.024 inch.

The composition by weight of the resin binder formulation used for the intermittent print-bonding is:
(1) 6.0 lbs. of a 46% solids latex of Rohm & Haas HA-8, primarily a polyethyl acrylate polymer
(2) 60 ml. of a 50% aqueous solution of "ASTRINGEN" aluminum hydroxy chloride $Al_2(OH)_5Cl \cdot 2H_2O$, sp. gr. 1.3
(3) Blue coloring 0.1 lb.
(4) Anti-foam agent 0.05 lb.

The formulation has a pH of 4.1 and a viscosity of 600 (Brookfield, #3 spindle, 30 rpm).

The fibrous card web is pretreated or pre-moistened with a large amount of water to the extent of about 190% moisture based on the weight of the fibers in the web.

The extra dilution with water is sufficient by itself to upset the stability of the resin dispersion when applied to the web and it instantly coagulates and precipitates on the very wet fibrous web. The printed web is then processed, dried and cured.

The width of the binder line in the finished product is about 0.06 inch which represents a controlled total migration of about 150%.

The resulting nonwoven fabric has a finished weight of 650 grains per square yard and has excellent strength, excellent softness, drape and hand, and excellent cross-resilience.

EXAMPLE V

A fibrous card web weighing about 500 grains per square yard and comprising 100% rayon fibers 1½ denier and 1½ inches in length is intermittently print bonded by the rotogravure process using an engraved roll having 6 horizontal wavy lines per inch. The width of each line as measured on the engraved roll is 0.024 inch.

The composition by weight of the resin binder formulation used for the intermittent print-bonding is:
(1) 5.3 lbs. of a 50% solids latex of National Starch 5328, a vinyl acetate-acrylic ester copolymer
(2) 40 ml. of a 50% aqueous solution of "ASTRINGEN" aluminum hydroxy chloride $Al_2(OH)_5Cl \cdot 2H_2O$, sp. gr. 1.3
(3) Blue coloring 0.1 lb.
(4) Anti-foam agent 0.05 lb.
(5) CH thickener 0.3 lb.

The formulation has a pH of 6.5 and a viscosity of 2000 (Brookfield, #3 spindle, 30 rpm).

The fibrous card web is pretreated or pre-moistened with a large amount of water to the extent of about 210% moisture based on the weight of the fibers in the web.

The extra dilution with water is sufficient by itself to upset the stability of the resin dispersion when applied to the web and it instantly coagulates and precipitates on the very wet fibrous web. The printed web is then processed, dried and cured.

The width of the binder line in the finished product is about 0.54 inch which represents a controlled total migration of about 125%.

The resulting nonwoven fabric has a finished weight of 650 grains per square yard and has excellent strength, excellent softness, drape and hand, and excellent cross-resilience.

EXAMPLE VI

A fibrous card web weighing about 500 grains per square yard and comprising 100% rayon fibers 1½ denier and 1½ inches in length is intermittently print bonded by the rotogravure process using an engraved roll having 6 horizontal wavy lines per inch. The width of each line as measured on the engraved roll is 0.024 inch.

The composition by weight of the resin binder formulation used for the intermittent print-bonding is:
(1) 6.45 lbs of a 46% solids latex of Rohm & Haas HA-8, primarily a polyethyl acrylate polymer
(2) 60 ml. of a 20% ammoniacal (28% $NH_3$) solution of "REHYDROL" aluminum chlorhydroxide-propylene glycol complex (12.6 grams)
(3) Blue coloring 0.1 lb.
(4) Anti-foam agent 0.05 lb.

The formulation has a pH of 9.7 and a viscosity of 1620 (Brookfield, #3 spindle, 30 rpm).

The fibrous card web is pretreated or pre-moistened with a large amount of water to the extent of about 190% moisture based on the weight of the fibers in the web.

The extra dilution with water is sufficient by itself to upset the stability of the resin dispersion when applied to the web and it instantly coagulates and precipitates on the very wet fibrous web. The printed web is then processed, dried and cured.

The width of the binder line in the finished product is about 0.05 inch which represents a controlled total migration of about 108%.

The resulting nonwoven fabric has a finished weight of 650 grains per square yard and has excellent strength, excellent softness, drape and hand, and excellent cross-resilience.

EXAMPLE VII

The procedures of Example VI are followed substantially as set forth therein with the exception that the polyethyl acrylate polymer is replaced by Goodrich Geon 576, a plasticized polyvinyl chloride-lower alkyl acrylate copolymer stabilized with an anionic surfactant.

The results are comparable to those obtained in Example VI and the product is commercially acceptable.

EXAMPLE VIII

The procedures of Example VI are followed substantially as set forth therein with the exception that the propylene glycol complex of aluminum chlorhydroxide is replaced by the trimethylol propane complex.

The results are comparable to those obtained in Example VI and the product is commercially acceptable.

EXAMPLE IX

The procedures of Example VI are followed substantially as set forth therein with the exception that the propylene glycol complex of aluminum chlorhydroxide is replaced by the glycerol complex.

The results are comparable to those obtained in Example VI and the product is commercially acceptable.

EXAMPLE X

The procedures of Example VI are followed substantially as set forth therein with the exception that the propylene glycol complex of aluminum chlorhydroxide is replaced by the 1,3-butanediol complex.

The results are comparable to those obtained in Example VI and the product is commercially acceptable.

EXAMPLE XI

The procedures of Example VI are followed substantially as set forth therein with the exception that the propylene glycol complex of aluminum chlorhydroxide is replaced by the ethylene glycol complex.

The results are comparable to those obtained in Example VI and the product is commercially acceptable.

EXAMPLE XII

The procedures of Example VI are followed substantially as set forth therein with the exception that the propylene glycol complex of aluminum chlorhydroxide is replaced by the Carbowax 400 polyethylene glycol complex.

The results are comparable to those obtained in Example VI and the product is commercially acceptable.

EXAMPLE XIII

The procedures of Example VI are followed substantially as set forth therein with the exception that the propylene glycol complex of aluminum chlorhydroxide is replaced by the triethylene glycol complex.

The results are comparable to those obtained in Example VI and the product is commercially acceptable.

EXAMPLE XIV

The procedures of Example VI are followed substantially as set forth therein with the exception that the propylene glycol complex of aluminum chlorhydroxide is replaced by the sorbitol complex.

The results are comparable to those obtained in Example VI and the product is commercially acceptable.

EXAMPLE XV

A fibrous card web weighing about 500 grains per square yard and comprising 100% rayon fibers 1½ denier and 1½ inches in length is intermittently print bonded by the rotogravure process using an engraved roll having 6 horizontal wavy lines per inch. The width of each line as measured on the engraved roll is 0.024 inch.

The composition by weight of the resin binder formulation used for the intermittent print-bonding is:
(1) 5.16 lbs. of a 46% solids latex of Rohm & Haas HA-8, primarily a polyethyl acrylate polymer
(2) 40 ml. of a 50% aqueous solution of Aluminum Complex 101 myristic acid complex of aluminum chlorhydroxide, sp. gr. 1.3
(3) Blue coloring 0.1 lb.
(4) Anti-foam agent 0.05 lb.
(5) Water 0.5 lb.

The formulation has a pH of 7.4 and a viscosity of 600 (Brookfield, #3 spindle, 30 rpm).

The fibrous card web is pretreated or pre-moistened with a large amount of water to the extent of about 190% moisture based on the weight of the fibers in the web.

The extra dilution with water is sufficient by itself to upset the stability of the resin dispersion when applied to the web and it instantly coagulates and precipitates on the very wet fibrous web. The printed web is then processed, dried and cured.

The width of the binder line in the finished product is about 0.05 inch which represents a controlled total migration of about 108%.

The resulting nonwoven fabric has a finished weight of 650 grains per square yard and has excellent strength, excellent softness, drape and hand, and excellent cross-resilience.

EXAMPLE XVI

The procedures of Example XV are followed substantially as set forth therein with the exception that the polyethyl acrylate polymer is replaced by Goodrich Geon 576, a plasticized polyvinyl chloride-lower alkyl acrylate copolymer stabilized with an aniionic surfactant.

The results are comparable to those obtained in Example XV and the product is commercially acceptable.

EXAMPLE XVII

The procedures of Example XV are carried out substantially as set forth therein with the exception that the myristic acid complex is replaced by the stearic acid complex.

The results are comparable to those obtained in Example XV and the product is commercially acceptable.

EXAMPLE XVIII

The procedures of Example XV are carried out substantially as set forth therein with the exception that the myristic acid complex is replaced by the palmitic acid complex.

The results are comparable to those obtained in Example XV and the product is commercially acceptable.

EXAMPLE XIX

The procedures of Example XV are carried out substantially as set forth therein with the exception that the myristic acid complex is replaced by the oleic acid complex.

The results are comparable to those obtained in Example XV and the product is commercially acceptable.

EXAMPLE XX

The procedures of Example XV are carried out substantially as set forth therein with the exception that the myristic acid complex is replaced by the benzoic acid complex.

The results are comparable to those obtained in Example XV and the product is commercially acceptable.

Having now described the invention in specific detail and exemplified the manner in which it may be carried into practice, it will be readily apparent to those skilled in the art that innumerable variations, applications, modifications, and extensions of the basic principles involved may be made without departing from its spirit and scope.

What is claimed is:

1. A stable aqueous resin composition having controlled migration, diffusion, penetration, and spread properties when applied to nonwoven textile fabrics comprising from about 0.1% to about 60% by weight on a solids basis of a high molecular weight synthetic resin in latex form prepared by the emulsion polymerization of an ethylenically unsaturated monomer or a mixture of two or more ethylenically unsaturated monomers and from about 0.01% by weight to about 6% by weight, based on the weight of said synthetic resin, of an aluminum chlorhydroxide complex migration control agent selected from the group consisting of: (a) aluminum chlorhydroxide; (b) reaction products of aluminum chlorhydroxide and polyhydroxy compounds; (c) reaction products of aluminum chlorhydroxide and monocarboxylic acids; and (d) mixtures thereof.

2. A resin composition as defined in claim 1 wherein the migration control agent is an aluminum chlorhydroxide having the formula $Al(OH)_5Cl$.

3. A resin composition as defined in claim 1 wherein the migration control agent is a reaction product of an aluminum chlorhydroxide and a glycol.

4. A resin composition as defined in claim 1 wherein the migration control agent is a reaction product of an aluminum chlorhydroxide and propylene glycol.

5. A resin composition as defined in claim 1 wherein the migration control agent is a reaction product of $Al(OH)_5Cl$ and propylene glycol.

6. A resin composition as defined in claim 1 wherein the migration control agent is a reaction product of an aluminum chlorhydroxide and a saturated aliphatic monocarboxylic acid.

7. A resin composition as defined in claim 1 wherein the migration control agent is a reaction product of an aluminum chlorhydroxide and myristic acid.

8. A resin composition as defined in claim 1 wherein the migration control agent is a reaction product of $Al(OH)_5Cl$ and myristic acid.

9. A resin composition as defined in claim 1 wherein the migration control agent is an aluminum chlorhydroxide having the structural formula $Al_2(OH)_xCl_{6-x}$ wherein x is a number having an average value of from 1 to 5.

* * * * *

UNITED STATES PATENT AND TRADEMARK OFFICE
CERTIFICATE OF CORRECTION

PATENT NO. : 4,144,209                                            Page 1 of 2
DATED      : March 13, 1979
INVENTOR(S): Arthur H. Drelich, et al.

It is certified that error appears in the above-identified patent and that said Letters Patent are hereby corrected as shown below:

At Column 1, Line 41, "composition or into" should be
    -- composition on or into --.
At Column 1, Line 58, "and mixture thereof" should be
    -- and mixtures thereof --.
At Column 2, Line 64, "doWebber" should be -- do Webber --.
At Column 6, Line 17, "methacrylate" should be
    -- methacrylamide --.
At Column 10, Line 9, "acrytle" should be -- acrylate --.
At Column 10, Line 11, "CHENOL" should be -- CKENOL --.
At Column 10, Line 51, "Ph" should be -- pH --.
At Column 14, Line 19, "aniionic" should be -- anionic --.
At Column 15, Line 18, "having the formula $Al(OH)_5Cl$" should
    be -- having the structural formula $Al_2(OH)_5Cl$ --.
At Column 16, Line 6, "$Al(OH)_5Cl$" should be -- $Al_2(OH)_5Cl$ --.

UNITED STATES PATENT AND TRADEMARK OFFICE
CERTIFICATE OF CORRECTION

PATENT NO. : 4,144,209

DATED : March 13, 1979

INVENTOR(S) : Arthur H. Drelich, et al.

It is certified that error appears in the above-identified patent and that said Letters Patent are hereby corrected as shown below:

At Column 16, Line 16, "$Al(OH)_5Cl$" should be -- $Al_2(OH)_5Cl$ --.

Signed and Sealed this

Tenth Day of July 1979

[SEAL]

Attest:

Attesting Officer

LUTRELLE F. PARKER
Acting Commissioner of Patents and Trademarks